(12) United States Patent
Wei

(10) Patent No.: US 10,348,435 B2
(45) Date of Patent: Jul. 9, 2019

(54) TERMINAL SIDE AND BASE STATION SIDE DEVICE, TERMINAL DEVICE, BASE STATION, AND WIRELESS COMMUNICATION METHOD

(71) Applicant: SONY CORPORATION, Tokyo (JP)

(72) Inventor: Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 36 days.

(21) Appl. No.: 15/553,439

(22) PCT Filed: Apr. 14, 2016

(86) PCT No.: PCT/CN2016/079241
§ 371 (c)(1),
(2) Date: Aug. 24, 2017

(87) PCT Pub. No.: WO2016/165624
PCT Pub. Date: Oct. 20, 2016

(65) Prior Publication Data
US 2018/0248640 A1 Aug. 30, 2018

(30) Foreign Application Priority Data
Apr. 17, 2015 (CN) .......................... 2015 1 0184481

(51) Int. Cl.
*H04J 11/00* (2006.01)
*H04W 48/16* (2009.01)

(52) U.S. Cl.
CPC ......... *H04J 11/0073* (2013.01); *H04W 48/16* (2013.01)

(58) Field of Classification Search
CPC ... H04J 11/0073; H04W 48/16; H04W 56/00; H04W 56/001; H04W 36/00835; H04W 36/08; H04W 16/14; H04W 36/0083
(Continued)

(56) References Cited

U.S. PATENT DOCUMENTS 8,050,225 B2    11/2011  Luo
2009/0232125 A1*  9/2009  Kim ..................... H04J 11/0093
                                                           370/350
(Continued)

FOREIGN PATENT DOCUMENTS

CN    101755388 A    6/2010
CN    102356671 A    2/2012
(Continued)

OTHER PUBLICATIONS

International Search Report dated Jul. 21, 2016, in PCT/CN2016/079241 filed Apr. 14, 2016.

*Primary Examiner* — Phong La
(74) *Attorney, Agent, or Firm* — Xsensus LLP

(57) ABSTRACT

A terminal and base station side device, a terminal device, a base station, and a wireless communication method. The terminal side device includes: a searching unit, configured to adopt a synchronization signal sequence corresponding to a target frequency range to be searched to search a target cell; and a synchronization unit, configured to perform synchronization based on the synchronization signal detected by the searching unit to synchronize the device to the target cell, the case the target frequency range belongs to a first frequency range, the searching unit adopts the synchronization signal sequence in a first subset of a synchronization signal sequence set to search the target cell, the first subset being a proper subset of the synchronization signal sequence set. Thereby, a number of synchronization signal sequence matching in a cell searching procedure is reduced and time for user equipment to synchronize to the target cell is shortened.

19 Claims, 10 Drawing Sheets

(58) Field of Classification Search
USPC .......................................................... 370/350
See application file for complete search history.

(56) References Cited

U.S. PATENT DOCUMENTS

| | | | | |
|---|---|---|---|---|
| 2011/0269449 A1* | 11/2011 | Kazmi | .................... | H04B 7/024 |
| | | | | 455/422.1 |
| 2014/0038616 A1* | 2/2014 | Burbidge | .............. | H04W 36/18 |
| | | | | 455/442 |
| 2014/0045505 A1* | 2/2014 | Henry | ............... | H04W 36/0061 |
| | | | | 455/444 |
| 2014/0248886 A1* | 9/2014 | Yamazaki | ........... | H04W 52/244 |
| | | | | 455/443 |
| 2014/0293954 A1* | 10/2014 | Horvat | ................. | H04W 48/16 |
| | | | | 370/330 |
| 2015/0230146 A1* | 8/2015 | Miao | ................ | H04W 36/0066 |
| | | | | 455/436 |
| 2015/0296486 A1* | 10/2015 | Park | ...................... | H04W 24/02 |
| | | | | 370/329 |
| 2015/0312851 A1* | 10/2015 | Ode | ...................... | H04W 48/20 |
| | | | | 370/252 |
| 2015/0327202 A1* | 11/2015 | Xu | .................... | H04W 56/0015 |
| | | | | 370/280 |
| 2015/0373654 A1* | 12/2015 | Yasukawa | ............. | H04W 56/00 |
| | | | | 370/338 |
| 2016/0037407 A1* | 2/2016 | Alamshahi | ........ | H04W 36/0083 |
| | | | | 370/331 |
| 2017/0142741 A1* | 5/2017 | Kaur | .................. | H04W 56/002 |
| 2017/0311206 A1* | 10/2017 | Ryoo | .................... | H04W 24/08 |
| 2017/0318473 A1* | 11/2017 | Futaki | .................. | H04W 16/14 |

FOREIGN PATENT DOCUMENTS

| | | |
|---|---|---|
| CN | 102572970 A | 7/2012 |
| CN | 103686889 A | 3/2014 |

\* cited by examiner

TERMINAL SIDE AND BASE STATION SIDE DEVICE, TERMINAL DEVICE, BASE STATION, AND WIRELESS COMMUNICATION METHOD

TECHNICAL FIELD

The present disclosure generally relates to the field of wireless communication, and in particular to a device on a terminal side, a terminal device, a device on a base station side and a base station in a wireless communication system, and wireless communication methods applied in the above devices.

BACKGROUND

With increasing requirements for high-speed data transmission, LTE (long-term evolution) becomes one of the most competitive wireless transmission technologies. A user equipment (UE) may access to an LTE network only after a process including cell search, acquiring system information of cell and random access. The major purpose of the cell search includes: (1) synchronizing with the cell in terms of frequency and symbol; (2) acquiring system frame timing, i.e., a starting position of a downlink frame; and (3) determining a physical layer cell identity (PCI) of the cell. The UE performs the cell search on start-up, however, in order to support the mobility, the UE may continuously search for a neighboring cell, perform synchronization and estimate the quality of the received signal for the neighboring cell, so as to determine whether to perform handover or cell reselection.

With the increasing requirements for data transmission, a critical way for improving overall performance of the system is to increase transmission bandwidth and improve spectrum utilization ratio. Under this background, more and more operators focus on using unauthorized frequency bands, and consider taking the unauthorized frequency bands as a supplementary for existing LTE authorized frequency bands to improve quality of service for users.

Communication on the unauthorized frequency band for a cell and communication for other systems co-exist and share the frequency spectrum resource. Therefore, to a certain extent, the signal of the cell must retreat due to other systems having a higher priority (such as radar), or the cell may operate in a fixed time period after negotiating with other systems (such as WiFi). If the cell search and synchronization take a long time, it is not beneficial for initial access of the UE, cell reselection and handover, which results in limitation for the usage of the unauthorized frequency band. Therefore, it is desired that the UE can perform search and synchronize rapidly with respect to a cell on the unauthorized frequency band.

SUMMARY

An overview of the present disclosure is simply given below to provide basic understanding for some aspects of the present disclosure. It should be understood that this overview is not an exhaustive overview of the present disclosure. It is intended to neither determine a critical part or an important part of the present disclosure, nor to limit the scope of the present disclosure. An object of the overview is only to give some concepts in a simplified manner, which serves as a preface of a more detailed description described later.

A device on a terminal side in a wireless communication system is provided according to an aspect of the present disclosure. The device includes: a searching unit configured to search for a target cell by means of a synchronization signal sequence corresponding to a target frequency range to be searched; and a synchronizing unit configured to perform synchronization based on a synchronization signal detected by the searching unit, so as to synchronize the device with the target cell, where in a case that the target frequency range falls within a first frequency range, the searching unit searches for the target cell by means of a synchronization signal sequence in a first subset of a synchronization signal sequence set, and the first subset is a proper subset of the synchronization signal sequence set.

A wireless communication method performed by a device on a terminal side is provided according to another aspect of the present disclosure. The method includes: searching for a target cell by means of a synchronization signal sequence corresponding to a target frequency range to be searched; and performing synchronization based on a searched synchronization signal, so as to synchronize the device with the target cell, where in a case that the target frequency range falls within a first frequency range, the target cell is searched by means of a synchronization signal sequence in a first subset of a synchronization signal sequence set, and the first subset is a proper subset of the synchronization signal sequences set.

A device on a base station side in a wireless communication system is provided according to another aspect of the present disclosure. The device includes: an identity group determining unit configured to determine a physical layer cell identity group for a target cell, where the physical layer cell identity group is related to a frequency range of the target cell; and a secondary synchronization signal sequence generating unit configured to generate a secondary synchronization signal sequence for a secondary synchronization signal of the target cell based on the physical layer cell identity group, where in a case that the frequency range of the target cell falls within a first frequency range, the physical layer cell identity group is a first subset of a physical layer cell identity group set, and the first subset is a proper subset of the physical layer cell identity group set.

A wireless communication method performed by a device on a base station side is provided according to an aspect of the present disclosure. The method includes: determining a physical layer cell identity group for a target cell, where the physical layer cell identity group is related to a frequency range for the target cell; and generating a secondary synchronization signal sequence for a secondary synchronization signal of the target cell based on the physical layer cell identity group, where in a case that the frequency range of the target cell falls within a first frequency range, the physical layer cell identity group is a first subset of a physical layer cell identity group set, and the first subset is a proper subset of the physical layer cell identity groups set.

A terminal device capable of communicating with a base station on a first carrier is provided according to an aspect of the present disclosure. The device includes: a communication unit configured to receive a synchronization signal transmitted from the base station on a second carrier different from the first carrier, and a synchronizing unit configured to match a secondary synchronization signal in the synchronization signal with a sequence in a first subset of a secondary synchronization signal sequence set, to determine the secondary synchronization signal, and the first subset is a proper subset of the secondary synchronization signal sequences set.

A base station in a wireless communication system is provided according to an aspect of the present disclosure, and the base station is capable of communicating with a wireless communication terminal on a first carrier. The base station includes a communication unit configured to transmit a synchronization signal comprising a secondary synchronization signal on a second carrier different from the first carrier, wherein the secondary synchronization signal is selected from a first subset of a secondary synchronization signal sequence set, and the first subset is a proper subset of the secondary synchronization signal sequence set.

According to the aspects of the present disclosure, the number of matching with the synchronization signal sequence during cell search is reduced, thereby greatly shortening a time period for synchronizing the UE to the target cell.

BRIEF DESCRIPTION OF THE DRAWINGS

The embodiments of the present disclosure are described below in conjunction with the drawings, hence the above and other objectives, features and advantages of the present disclosure can be understood more easily. In the drawings, same or corresponding technical features or components may be represented with same or corresponding reference numerals. The size and relative position of a unit are unnecessarily drawn to scale in the drawings.

DETAILED DESCRIPTION OF EMBODIMENTS

Figure 1:
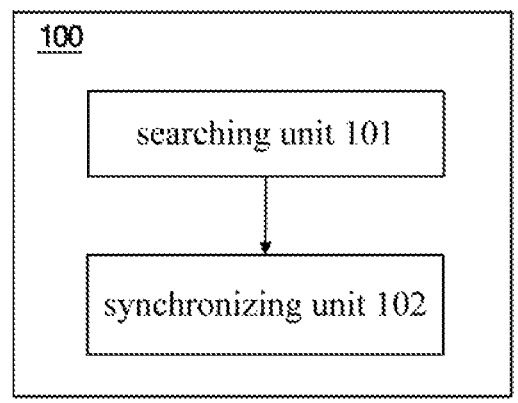
FIG. 1 is a structural block diagram of a device on a terminal side in a wireless communication system according to an embodiment of the present disclosure.

An exemplary embodiment of the present invention will be described hereinafter in conjunction with the drawings. For the purpose of conciseness and clarity, not all features of the embodiments are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the drawing, and other details having little relationship to the present disclosure are omitted.

In order to support cell search, two types of downlink synchronization signals are defined in the LTE: 3 primary synchronization signals (PSS) and 168 secondary synchronization signals (SSS). In this case, 504 different PCIs are defined by combinations of the primary synchronization signals and the secondary synchronization signals in the LTE, and each of the PCIs corresponds to a specific downlink reference signal sequence. The 168 secondary synchronization signals are respectively identified as 168 cell identity groups, and the 3 primary synchronization signals are respectively identified as 3 cell identities. The PCI of the cell is determined based on both the primary synchronization signal and the secondary synchronization signal. A base station determines a transmission sequence of the transmitted primary synchronization signal and the transmitted secondary synchronization signal once determining the cell identity group and the cell identity (PCI=3*cell identity group+cell identity). After finding the signals, a UE may demodulate the signals based on all possible combinations, to determine the cell identity group and the cell identity used by the base station.

In order to demodulate the PCI of the cell, the UE matches possible primary synchronization signals and secondary synchronization signals one by one. In order to improve a speed of synchronizing the UE to the cell and to shorten an access time, a new technical solution is provided in the present disclosure, in which, a target cell is searched for using a synchronization signal sequence in a specific proper subset of a synchronization signal sequence set defined in an existing communication protocol, to shorten a possible access time for a UE. For example, the specific proper subset may be determined based on a target frequency range to be searched.

FIG. 1 is a structural block diagram of a device 100 on a terminal side in a wireless communication system according to an embodiment of the present disclosure. For example, the device 100 for example but is not limited to a mobile terminal device such as a mobile phone and a notebook computer, and a component (such as a chip) or means which are arranged in the mobile terminal device or are used in combination with the mobile terminal.

The device 100 includes a searching unit 101 and a synchronizing unit 102. The searching unit 101 is configured to search for a target cell with a synchronization signal sequence corresponding to a target frequency range to be searched. For example, in a case that the target frequency range falls within a first frequency range, the searching unit 101 may search for the target cell with a synchronization signal sequence in a first subset, corresponding to the first frequency range, of a synchronization signal sequence set. Here, the first subset is a proper subset of the synchronization signal sequence set. The synchronization signal sequence set for example but is not limited to a synchronization signal sequence set defined in an existing communication protocol. A correspondence between the target frequency range and the first subset may be preset, and may be preset in a UE (for example, the correspondence may be written in a boot file of the UE) or informed to the UE by a base station. In an embodiment, the device 100 may further include a determining unit (not shown) configured to determine whether the target frequency range falls within the first frequency range.

In an embodiment, the first frequency range may be a range on the unauthorized frequency band for a wireless communication system, and the target cell to be searched is a cell which may be accessed on the unauthorized frequency spectrum. In the embodiment, a synchronization signal sequence set is for example and not limited to a synchronization signal sequence set used when a communication device in the wireless communication system communicates on a carrier in an authorized frequency band. Since the wireless communication system where the device 100 is located typically can only perform opportunistic use on unauthorized frequency band resources in which an idle resource may be fleet, the solution according to the present disclosure is particularly adapted to search for a cell operating in an unauthorized frequency band, thereby shortening a time period for searching for a cell and improving a resource utilization rate. Optionally, for example, the unauthorized frequency band may be further divided into multiple sub frequency ranges, such as a sub frequency range co-existing with the WiFi/Radar and a common unauthorized sub frequency range. The first frequency range may correspond to one of the multiple sub frequency ranges. For example, the synchronization signal sequence set is a synchronization signal sequence set in the whole unauthorized frequency band, and fast search is performed with a synchronization signal sequence contained in a proper subset of the synchronization signal sequence set. A requirement on an access time for a sub frequency range co-existing with a different system is stricter than that for a common sub frequency range. In this example, a proper subset of the synchronization signal sequence corresponding to the sub frequency range co-existing with the different system may be set to have a smaller range than the common unauthorized frequency range, thereby further accelerating a process of cell discovery.

The synchronizing unit 102 is configured to perform synchronization based on a synchronization signal detected by the searching unit 101, to synchronize the device 100 to the target cell. Due to the usage of the proper subset, the number of matching possibly performed when the UE searches for the target cell is reduced significantly, and a time period for synchronization between the UE and the target cell is further shortened.

Hereinafter, for simple description, a devices and a method according to the present disclosure are described in conjunction with access into a cell in an unauthorized frequency band in a way of example. It can be understood by those skilled in the art that, the device and method according to the present disclosure are also adapted to access into any other cells such as an authorized frequency range in which a synchronization process needs to be accelerated, and also the synchronization time can be shortened. For example, in a scenario of dense deployment of small cells, a UE moving at a high speed also needs to access into the small cell rapidly. Therefore, a frequency range of the small cell may be taken as the first frequency range, so as to accelerate a synchronization process.

For the synchronization signals currently defined, the number of matching with the primary synchronization signals is 3 at most since there are three primary synchronization signals, and the number of matching with the secondary synchronization signals is up to 168 since the secondary synchronization signal has different sequences in different frames and there are 168 secondary synchronization signals. Accordingly, in a solution in which a proper subset of a synchronization signal sequence set is taken as a candidate synchronization signal set to be matched, the secondary synchronization signals can be optimized greatly. Therefore, in an embodiment, the synchronization signal sequence described above may be a secondary synchronization signal sequence. The searching unit 101 may be configured to decode a secondary synchronization signal of the target cell with a secondary synchronization signal sequence corresponding to, for example, a target frequency range in the unauthorized frequency band.

Currently, there is an agreement in the industry for utilization of the unauthorized frequency band that the unauthorized frequency band is used with assistance of the authorized frequency band, that is, a License Assisted Access of LTE (LAA-LTE) is used in a carrier aggregation way. For an LAA-LTE cell, in an embodiment, it may be defined that a secondary synchronization signal only uses a certain subset in an existing standard. For example, only 56 base sequences of 168 base sequences are used. In this case, the number of self-correlation (matching) performed by an UE on the secondary signal sequence is reduced, thereby greatly shortening the synchronization time.

In an embodiment, the device 100 may further include a communication interface (not shown). The communication interface may be configured to acquire a command for searching for the target cell and indication information of a first subset through a first cell in the authorized frequency band. For example, the communication interface may be configured to receive signaling including the command for searching for the target cell and the indication information of the first subset through the first cell in the authorized frequency band. The signaling, for example, may be broadcast signaling or RRC signaling.

By taking a case that the target cell is searched for by taking a proper subset, corresponding to the unauthorized frequency band, of the secondary synchronization signal sequence set as a synchronization signal sequence in the LAA-LTE scenario as an example, base sequences (there are 168 base sequences in the existing standard) of the secondary synchronization signal may be grouped based on a value of PCI mod 6, to group the sequences used by the secondary synchronization signal into 6 subsets as candidates of the first subset, and each of the subsets is numbered and the number is taken as indication information of the first subset. In another example, the subsets may be grouped based on an order of group IDs. For example, the base sequence of the secondary synchronization signal is grouped into 3 subsets.

In for example the above LAA-LTE scenario, after the device 100 accesses into the target cell, the communication interface of the device 100 may be further configured to acquire an indication related to an updated synchronization signal sequence through the target cell. In for example a scenario of communication in the unauthorized frequency band without assistance of an authorized carrier, the communication interface of the device 100 may also be configured to acquire an indication related to an updated synchronization signal sequence through the target cell after the device 100 accesses into the target cell. In other words, the indication related to the updated synchronization signal sequence can also be acquired in the unauthorized frequency band in this example.

Figure 2:
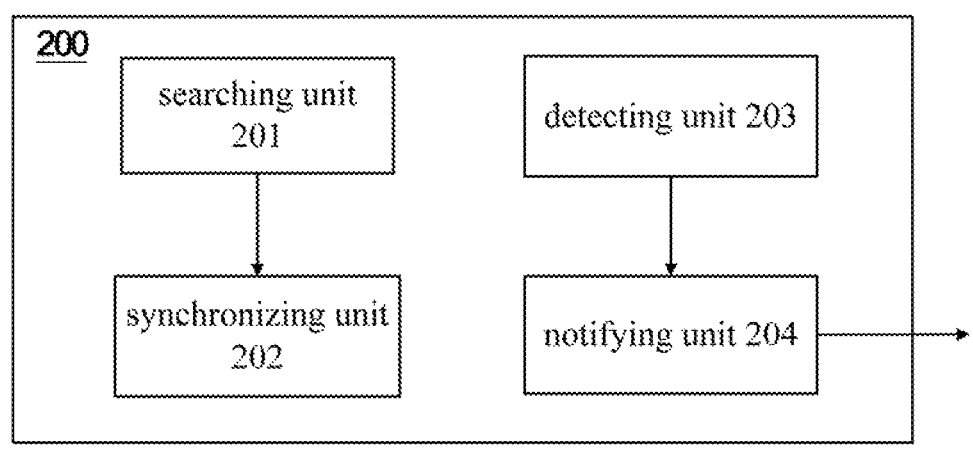
FIG. 2 is a structural block diagram of a device on a terminal side in a wireless communication system according to another embodiment of the present disclosure.

FIG. 2 is a structural block diagram of a device 200 on a terminal side in a wireless communication system according another embodiment of the present disclosure. The device 200 may include a searching unit 201, a synchronizing unit 202, a detecting unit 203 and a notifying unit 204. Functions and structures of the searching unit 201 and synchronizing unit 202 the same as those of the searching unit 101 and synchronizing unit 102 described in conjunction with FIG. 1 are not repeated herein. In the embodiment and other embodiments below, a same term (such as "first subset" and "first frequency range") represents same meaning as it does in the aforementioned embodiment.

The detecting unit 203 may detect whether an interference to a reference signal received by the device 200 in a first frequency range is too large due to using the first subset. Whether the interference is too large by for example but not limited to detecting a signal of reference signal received quality (RSRQ) and the like. For example but not limited to, in a case that it is determined there is a strong interference by detecting the RSRQ, a time duration of the strong interference may be further determined. It may be determined that the interference to the reference signal received by the device 200 in the first frequency range is too large due to using the first subset, in a case that the time duration of the strong interference exceeds a predetermined time threshold. In a case that it is detected that the interference is too large, the notifying unit 204 may notify a base station in a serving cell of the device 200 or a target cell of a result of the detecting. It should be noted that, in some examples, a current serving cell (such as a serving cell in an authorized frequency band) of the device 200 shares a base station with the target cell in an unauthorized frequency band. In other examples, the serving cell and the target cell may be managed by different base station entities. In this case, the notifying unit 204 may notify a base station in the serving cell of the a result of the detecting, and then the base station in the serving cell transmits the result of the detecting to a base station in the target cell through X2 signaling. In yet another embodiments, the device 200 may directly report the result of the detecting to the base station in the target cell after accessing into the target cell.

A synchronization signal sequence set may include multiple proper subsets for cell search in the first frequency range. The searching unit 201 may detect a synchronization signal transmitted by the base station of the target cell and an indication of a second subset selected from the multiple proper subsets by the base station of the serving cell/the target cell in response to the notification that the interference is too large sent by the notifying unit 204. Needless to say, the selected second subset is different from the first subset. The searching unit 201 may decode the transmitted synchronization signal with the second subset in response to the indication of the second subset.

Optionally, the base station of the target cell may select another synchronization signal sequence from the first subset in response to the notification that the interference is the too large sent by the notifying unit 204, instead of selecting a subset.

In the LAA-LTE scenario, a target cell of LAA-LTE is generally deployed in a frequency band different from a macro cell and a small cell, hence it is very possible to use same PSS and SSS in an actual deployment. Therefore, in a case of synchronizing to an LAA-LTE cell, in order to determine a usage sequence of a PSS or SSS used in the LAA-LTE cell, sequences of the macro cell and the small cell may be firstly used for matching, so as to accelerating a synchronization speed as much as possible. As an example, in a case that the device 200 accesses into an unauthorized frequency spectrum with assistance of LTE, the searching unit 201 searches by firstly taking a secondary synchronization signal of a cell in which the device 200 previously resides as a synchronization signal sequence. It can be understood that, the synchronization signal sequence contained in the first subset may correspond to a synchronization signal sequence of a serving cell in a current authorized frequency band or a previous authorized frequency band. The technical content and technical content to be described below are also applicable to the device 100 described in conjunction with FIG. 1.

In the case that the device 200 needs to perform inter-cell handover, the searching unit 201 may acquire an indication related to the first subset based on radio resource control (RRC) configuration information of a base station currently serving the device 200. The synchronization signal sequence set may include multiple proper subsets for cell search in the first frequency range, and a sequence number of the first subset is included in RRC configuration information.

If the searching unit 201 cannot search out the target cell with all sequences in the first subset, the searching unit 201 may search with a sequence in a third subset. The third subset here is one of the multiple proper subsets for the cell search in the first frequency range and is different from the first subset.

Figure 3:
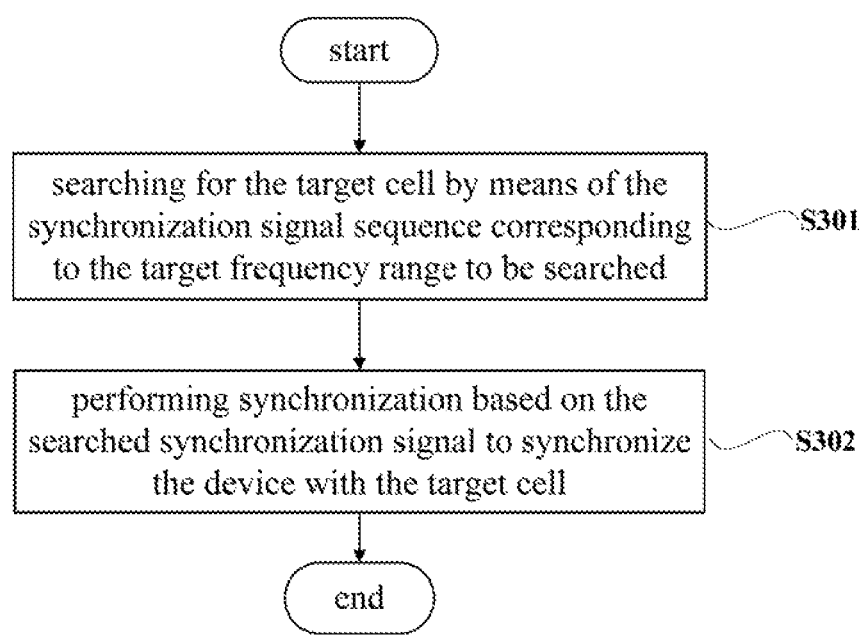
FIG. 3 is a flowchart of a wireless communication method applied in a device on a terminal side according to an embodiment of the present disclosure.

FIG. 3 is a flowchart illustrating a wireless communication method applied in a device on a terminal side according to an embodiment of the present disclosure. In step S301, a target cell is searched for with a synchronization signal sequence corresponding to a target frequency range to be searched. For example, in a case that the target frequency range falls within a first frequency range, the target cell is searched for with a synchronization signal sequence in a first subset of a synchronization signal sequence set. Here, the first subset is a proper subset of the synchronization signal sequence set. In step S302, synchronization is performed based on the found synchronization signal, to synchronize the device to the target cell. The embodiments and variations related to the steps in FIG. 3 are the same as those described in conjunction with FIGS. 1 and 2, which are not described hereinafter anymore.

Figure 4:
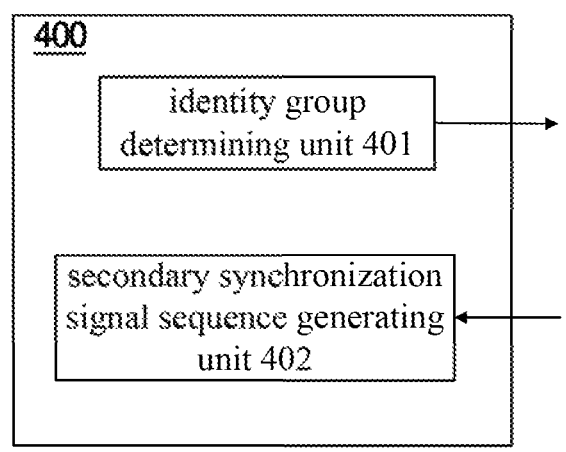
FIG. 4 is a structural block diagram of a device on a base station side in a wireless communication system according to an embodiment of the present disclosure.

A device 400 on a base station side in the wireless communication system according to an embodiment of the present disclosure is described below in conjunction with FIG. 4. The device 400 includes an identity group determining unit 401 and a secondary synchronization signal sequence generating unit 402. The identity group determining unit 401 may be configured to determine a physical layer cell identity group of a target cell. The identity group determining unit 401 may be configured to determine the physical layer cell identity group based on a frequency range of the target cell. For example, in a case that the frequency range of the target cell falls within a first frequency range, the physical layer cell identity group is determined as a first subset which is a proper subset of the physical layer cell identity group set. In an example, the identity group determining unit 401 may autonomously determine the physical layer cell identity group of the target cell based on the frequency range of the target cell. Optionally, the identity group determining unit 401 may determine the physical layer cell identity group of the target cell based on the frequency range of the target cell according to configuration made by an operator through operation administration and maintenance (OAM). In an example, the device 400 may further include a determining unit configured to determine whether the frequency range of the target cell falls within the first frequency range.

The secondary synchronization signal sequence generating unit 402 is configured to generate a secondary synchronization signal sequence for a secondary synchronization signal of the target cell based on the physical layer cell identity group determined by the identity group determining unit 400. In an embodiment, a secondary synchronization signal SSS may include a Zadoff-Chu sequence with a length of 63 (a direct current subcarrier (DC subcarrier) is arranged in the middle of the sequence, hence an actual transmission length is 62) and 5 subcarriers additionally reserved for a protection frequency band at a boundary, to form an SSS occupying 72 subcarriers (not including the DC) at the center. The SSS is transmitted in subframes 0 and 5 regardless of frequency division multiplexing (FDM) or time division multiplexing (TDM). In the LTE, the SSS is designed specially. For example, values of two SSSes (SSS1 and SSS2 are located in subframes 0 and 5, respectively) are selected from a set including 168 optional values, for example, a proper subset including 56 elements (referring to table 6.11.2.1-1 of standard 36.211, $N_{ID}^{(j)}=N_{ID}^{cell}/3$). A value of $SSS_1$ is different from that of $SSS_2$, therefore, a UE can be allowed to detect a timing of 10 ms for a system frame (i.e., the location of the subframe 0) once receiving only one SSS. This is because, during the cell search, the UE may search for multiple cells, and a time window of the search may be not enough for the UE to detect more than one SSS.

In an embodiment, the first frequency range may be a range on the unauthorized frequency band for the wireless communication system. The target cell may be a cell which may be accessed on the unauthorized frequency spectrum. In practice, the first frequency range may be other frequency ranges in which a synchronization process needs to be accelerated. For example, in a scenario of dense deployment of the small cells, if a UE moves at a high speed, the UE needs to access into the small cell rapidly. In this case, a frequency range for the small cell may be taken as the first frequency range, to accelerate the synchronization process.

Figure 5:
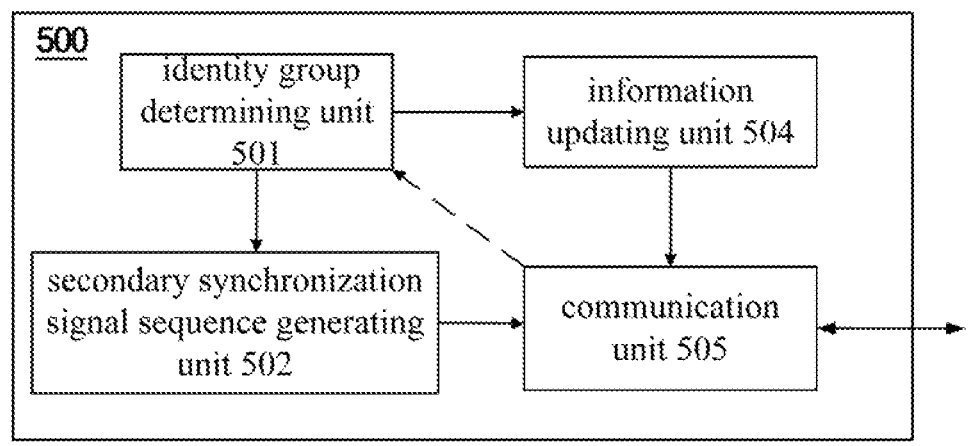
FIG. 5 is a structural block diagram of a device on a base station side in a wireless communication system according to an embodiment of the present disclosure.

FIG. 5 is a structural block diagram of a device 500 on a base station side in a wireless communication system according to an embodiment of the present disclosure. The device 500 includes an identity group determining unit 501, a secondary synchronization signal sequence generating unit 502, a communication unit 503 and an information updating unit 504. functions and structures of the identity group determining unit 501 and the secondary synchronization signal sequence generating unit 502 same as those of the identity group determining unit 401 and secondary synchronization signal sequence generating unit 402 described in conjunction with FIG. 4 are not described hereinafter anymore.

In the embodiment that the first frequency range is a range on the unauthorized frequency band for the wireless communication system and the target cell is a cell which may be accessed on the unauthorized frequency spectrum, the device 500 may transmit a secondary synchronization signal in an unauthorized frequency band corresponding to the target cell via the communication unit 503.

In addition, in an example, when a device on a UE side detects that an interference to a reference signal received by the device on the UE side in the first frequency range is too large due to using the first subset and notifies the base station of the target cell of a result of the detecting indicating that the interference is too large, the communication unit 503 of the device 500 of the base station side may further receive the notification indicating that the interference is too-large. It should be noted that, in some examples, a current serving cell (for example a serving cell in an authorized frequency band) of the device on the UE side shares a base station with a target cell in an unauthorized frequency band. In other examples, the serving cell and the target cell may be managed by different base station entities. In this case, the result of the detecting may be notified to a base station of the serving cell, and then the base station of the serving cell transmits the result of the detecting to a base station of the target cell through X2 signaling. In yet another embodiments, the device on the UE side may directly report the result of the detecting to the base station of the target cell after accessing into the target cell. In a case that the notification is received by the communication unit 503, the identity group determining unit 501 may determine a second subset as a physical layer cell identity group, the second subset is a proper subset of the physical layer cell identity group set and is different from the first subset. Then, the secondary synchronization signal sequence generating unit 502 may regenerate a secondary synchronization signal sequence based on the second subset. In a case that the identity group determining unit 501 determines the second subset as the physical layer cell identity group, the information updating unit 504 may generate system broadcast information, including indication information related to the second subset, to be transmitted by the target cell. Optionally, the information updating unit 403 may generate system broadcast information, including indication information related to the second subset, to be transmitted in an authorized frequency band.

In another example, the communication unit 503 may notify other devices on the base station side in the wireless communication system such as a device on a neighboring base station side of the indication information related to the second subset. The example is described hereinafter.

In an embodiment, the device 400 (500) on the base station side may acquire a physical layer cell identity group subset of a neighboring cell of the target cell, and in the case that radio resource management related to the neighboring cell is performed on a device on a terminal side in a current cell, generate radio resource control signaling, to notify the device on the terminal side of the identity group subset of the neighboring cell.

In another embodiment, the communication unit of the device 400 (500) on base station side may report an event that the interference is too large to a core network via an S1 interface on receiving the notification that the interference is too large and acquire information on an updated cell identity group from the core network.

Figure 6:
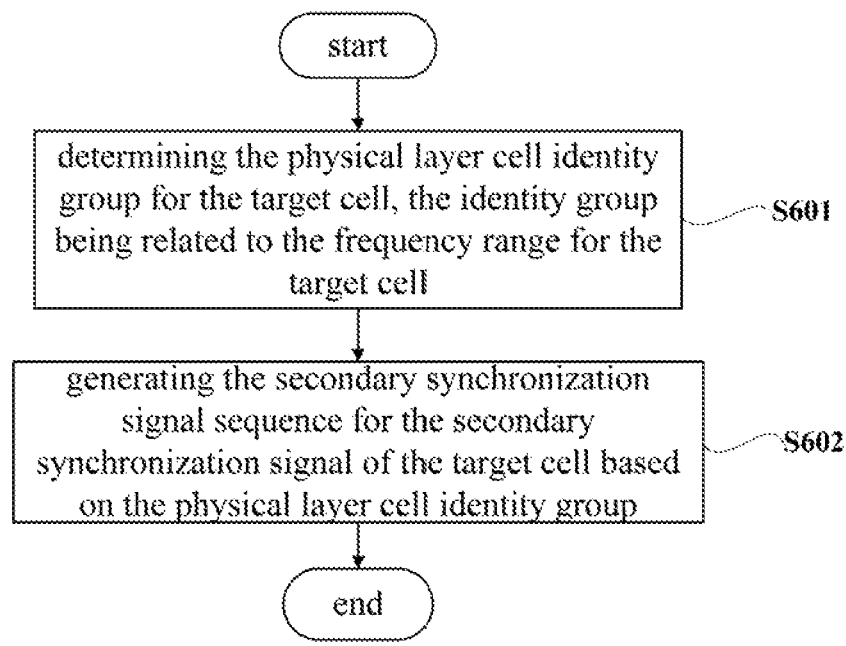
FIG. 6 is a flowchart of a wireless communication method applied in a device on a base station side according to an embodiment of the present disclosure.

FIG. 6 is a flowchart illustrating a wireless communication method applied in a device on a base station side according to an embodiment of the present disclosure. In step S601, a physical layer cell identity group of a target cell is determined. The physical layer cell identity group is related to a frequency range of the target cell. For example, in a case that the frequency range of the target cell falls within a first frequency range, the physical layer cell identity group is a first subset of a physical layer cell identity group set, and the first subset is a proper subset of the physical layer cell identity group set. In step S602, a secondary synchronization signal sequence for a secondary synchronization signal of the target cell is generated based on the physical layer cell identity group. The embodiments and variations related to the steps in FIG. 6 are the same as those described in conjunction with FIGS. 4 and 5, and are not described hereinafter anymore.

Figure 7:
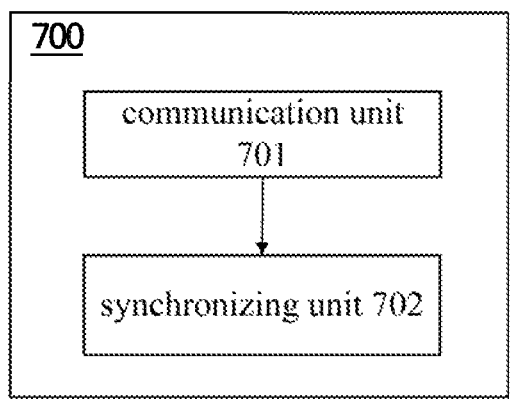
FIG. 7 is a structural block diagram of a wireless terminal device according to an embodiment of the present disclosure.

FIG. 7 is a structural block diagram of a wireless terminal device 700 according to an embodiment of the present disclosure. The wireless terminal device 700 can communicate with a base station on a first carrier. In an example, the first carrier may be in an authorized frequency band. The wireless terminal device 700 may include a communication unit 701 and a synchronizing unit 702. The communication unit 701 may receive a synchronization signal sent from the base station on a second carrier different from the first carrier. In an example, the second carrier may be in an unauthorized frequency band. The synchronizing unit 702 may match a secondary synchronization signal in the synchronization signal with a sequence in a first subset of a secondary synchronization signal sequence set, to determine the secondary synchronization signal. Here, the first subset is a proper subset of the secondary synchronization signal sequence set. In an embodiment, the secondary synchronization signal sequence set may be used when the wireless terminal device communicates on the first carrier.

A base station in the wireless communication system is further provided according to an embodiment of the present disclosure. The base station can communicate with a wireless communication terminal on a first carrier. The base station includes a communication unit, the communication unit may be configured to transmit a synchronization signal including a secondary synchronization signal on a second carrier different from the first carrier. Here, a secondary synchronization signal may be selected from a first subset which is a proper subset of a secondary synchronization signal sequence set. In an embodiment, the first carrier may be a carrier signal in authorized frequency band and the second carrier may be a carrier signal on an unauthorized frequency band. The secondary signal sequence set may be, for example, used when the base station communicates on the first carrier.

Hereinafter, the embodiments of the present disclosure are described in conjunction with FIGS. 8 and 9. It should be noted that, although a scenario of unauthorized frequency spectrum access with assistance of the LTE is taken as an example in FIGS. 8 and 9, those skilled in the art can apply corresponding solutions in an independent unauthorized network (i.e., a network without assistance of LTE) with conventional labors.

Figure 8:
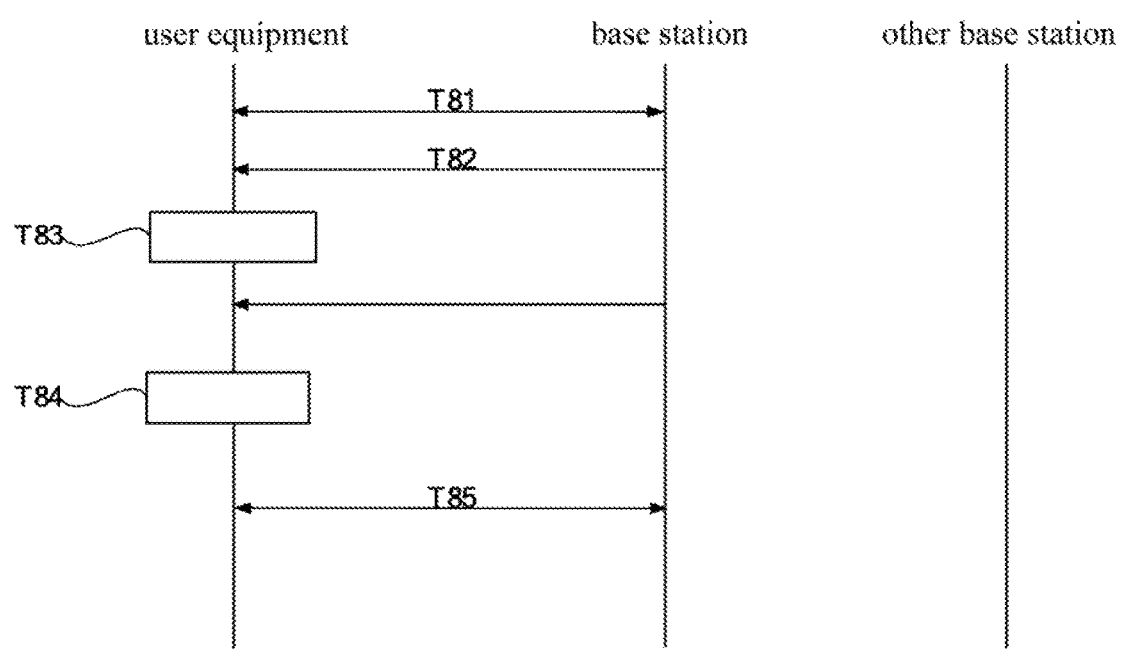
FIG. 8 is a timing diagram illustrating a synchronization process in a wireless communication system according to an embodiment of the present disclosure.

FIG. 8 is a timing diagram illustrating a synchronization process in a wireless communication system according to an embodiment of the present disclosure. FIG. 8 shows a scenario of an unauthorized frequency spectrum access with assistance of LTE. In the embodiment, all of cells and all of user equipments use a same fixed subset of a synchronization signal sequence set as a first subset. At a time instant T81, a UE communicates with a base station on a primary component carrier (an authorized frequency band in the embodiment). At a time instant T82, the base station transmits on the primary component carrier, a command indicating the UE to handover onto a secondary component carrier (an unauthorized frequency band in the embodiment) for communication to the UE. At a time instant T83, the UE switches to receive broadcast information on the secondary component carrier in response to the command. The broadcast information carries the fixed subset, as the first subset, of the synchronization signal sequence set. At a time instant T84, the UE matches a synchronization signal sequence in the received broadcast information with, for example, a fixed subset prestored in a boot file. Since the fixed subset is matched with the synchronization signal sequence, a secondary synchronization signal, a primary synchronization signal and a physical identity of a cell accessed in the unauthorized frequency band are determined. In this case, at a time instant T85, the UE is synchronized to the cell operating in the unauthorized frequency band and perform normal communication with the cell. In the embodiment, since the secondary cells uses the fixed subset of the synchronization signal sequence set, a serving base station operating in the unauthorized frequency band does not need to notify other base stations of the subset.

Reference is still made to FIG. 8, as compared with the scenario that all of the cells and all of the user equipments use the same fixed subset of the synchronization signal sequence set as the first subset, alternatively, each of the cells may use a fixed subset corresponding to the cell. In this case, at the time instant T84, the UE firstly matches the synchronization signal sequence in the broadcast information with a default subset. In the case that the synchronization signal sequence is matched with the default subset unsuccessfully, the UE may serve another subset as the default set with another subset, to match with the synchronization signal sequence. In an example, the UE may firstly serve a primary synchronization signal and a secondary synchronization signal same as those in the previous communication on the primary component carrier as the default subset, to match with the synchronization signal set.

Figure 9:
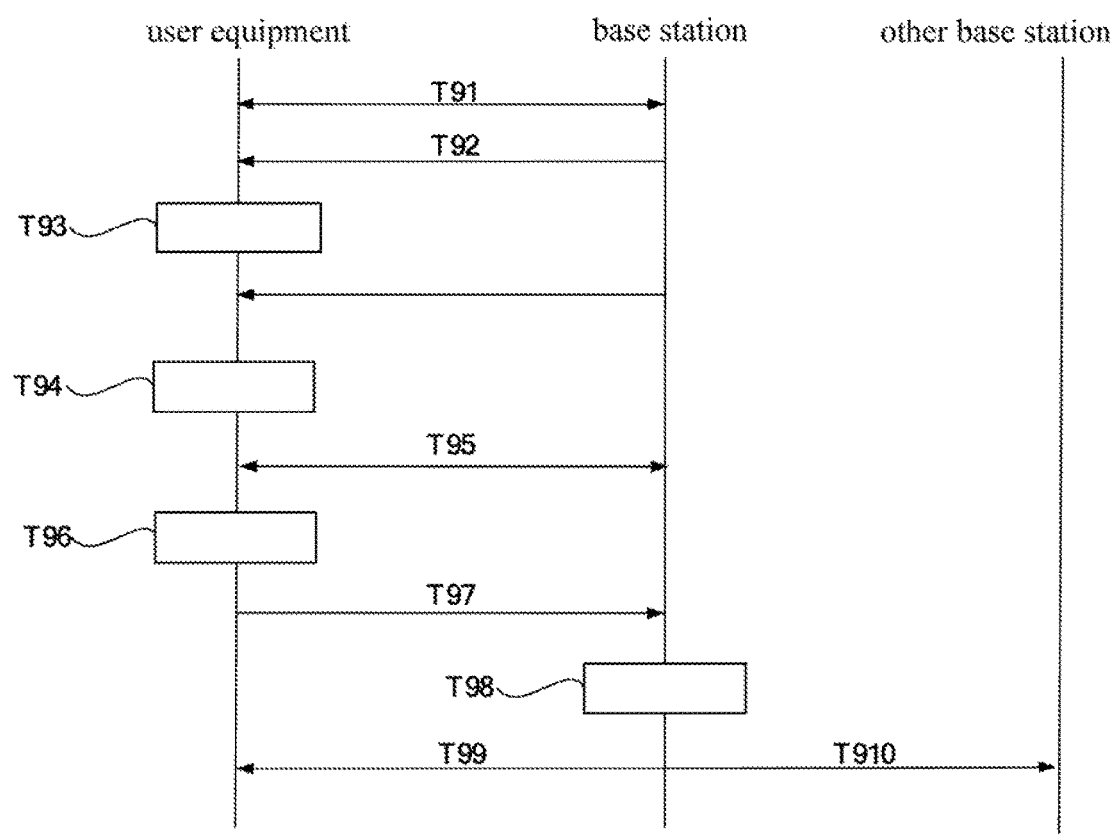
FIG. 9 is a timing diagram illustrating a synchronization process in a wireless communication system according to another embodiment of the present disclosure.

FIG. 9 is a timing diagram illustrating a synchronization process in a wireless communication system according to another embodiment of the present disclosure. FIG. 9 shows a scenario of an unauthorized frequency spectrum access with assistance of the LTE. In the embodiment, all of the cells use a default subset of a synchronization signal sequence set as a first subset first. At a time instant T91, a UE communicates with a serving base station on a primary component carrier (an authorized frequency band in the embodiment). At a time instant T92, the base station transmits on the primary component carrier, a command indicating the UE to handover onto a secondary component carrier (an unauthorized frequency band in the embodiment) for communication to the UE. At a time instant T93, the UE switches to receive broadcast information on the secondary component carrier in response to the command. The broadcast information carries a fixed subset, which is the first subset, of the synchronization signal sequence set. At a time instant T94, the UE matches a synchronization signal sequence in the received broadcast information with, for example, a default subset (preferably, a subset same as a default subset of a cell) prestored in a boot file. At a time instant T95, the UE is synchronized to a cell operating in the unauthorized frequency band and then performs normal communication with the cell.

At a time instant T96, the UE detects whether an interference to an reference signal received in the unauthorized frequency band by the UE is too large due to using the proper subset of the synchronization signal sequence set. If the interference is too large, the UE notifies the base station of the cell of the result of the detecting indicating that the interference is too large at a time instant 97. The notification may optionally be transmitted on the primary component carrier (the authorized frequency band) or the secondary component carrier (the unauthorized frequency band). At a time instant T98, the base station replaces the proper subset with another proper subset or selects a signal sequence (such as a secondary synchronization signal sequence) based on the original subset, on receiving the notification. Then, at time instants T99 and T910, the selected subset or the selected sequence are respectively transmitted to the UE and other base stations. Here, T99 and T910 may be the same time instant or different time instants.

The present disclosure is described above by referring to the flowcharts and/or the block diagrams of the methods and the devices according to the present disclosure. Each block of the flowcharts and/or the block diagrams and a combination of blocks of the flowcharts and/or the block diagrams can be implemented with computer program instructions. These computer program instructions may be provided to a general-purpose computer, a special-purpose computer or processors of other programmable data processing devices, to produce a machine, so as to generate a device implementing functions/operations defined in the blocks of the flowcharts and/or the block diagrams by executing these instructions via a computer or other programmable data processing devices.

These computer program instructions may also be stored in a computer readable medium capable of instructing the computer or other programmable data processing devices to operate in a specific manner. in this way, a manufacture including an instruction means (instruction means) implementing the functions/operations defined in the blocks of the flowchart and/or the block diagram is produced with the instruction stored in the computer readable medium.

The computer program instructions may also be loaded to the computer or other programmable data processing devices, in this way, a series of operation steps are performed on the computer and other programmable data processing devices, to generate a process realized by the computer. Therefore, the instructions executed on the computer or other programmable devices provide a process of implementing the functions/operations defined in the blocks of the flowcharts and/or the block diagrams.

It should be noted that, the flowchart and the block diagram in the drawings illustrate architectures, functions and operations which may be implemented based on the systems, methods and computer program products according to the embodiments of the present disclosure. Regarding on this, each block of the flowchart or the block diagram can represent a module, a program segment or a portion of codes. The module, the program segment or the portion of codes contain one or more executable instructions for implementing defined logical functions. It should be also noted that, in some alternative implementations, the functions shown in the blocks may be performed in an order different from the order shown in the drawings. For example, functions in two blocks represented successively may be performed in parallel, or sometimes performed in an order reverse to the order shown in the drawings, which depends on the related functions. It should be noted that, each block of the block diagrams and/or the flowcharts and a combination of blocks of the block diagram and/or the flowchart may be implemented by a dedicated hardware-based system performing specified to functions or operations, or may be implemented by a combination of dedicated hardware and computer instructions.

Figure 10:
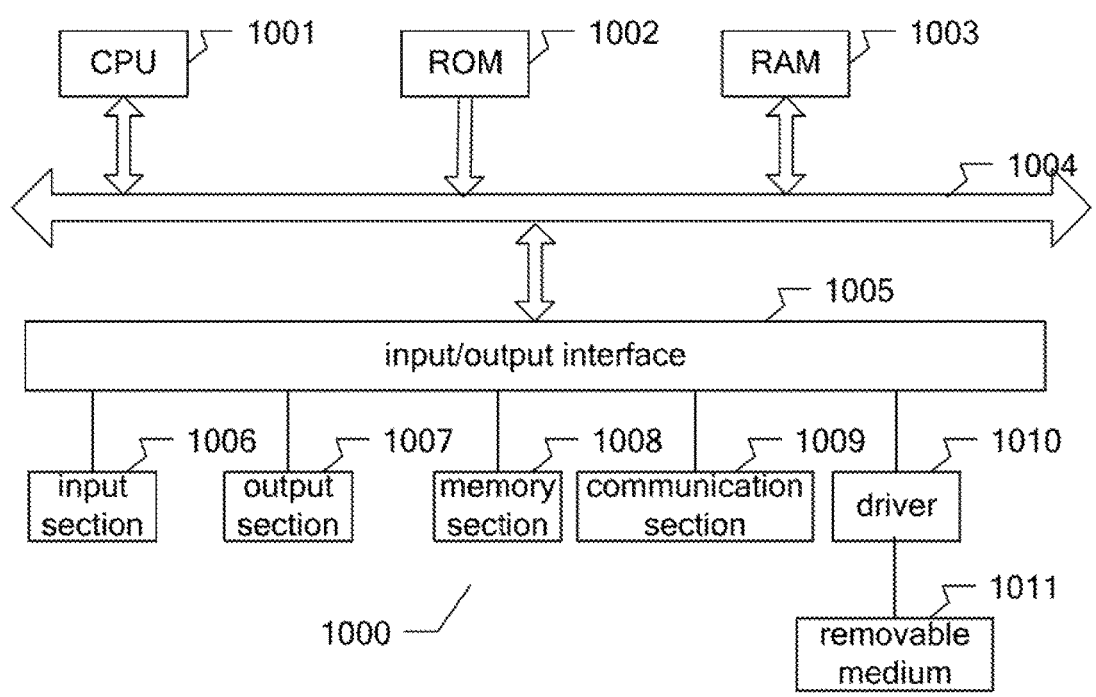
FIG. 10 is a block diagram illustrating an exemplary structure of a computer capable of implementing the present disclosure.

FIG. 10 is a block diagram illustrating an exemplary structure of a computer capable of implementing the present disclosure. In FIG. 10, a central processing unit (CPU) 1001 executes various processing according to a program stored in a read-only memory (ROM) 1002 or a program loaded to a random access memory (RAM) 1003 from a memory section 1008. The data needed for the various processing of the CPU 1001 may be stored in the RAM 1003 as needed.

The CPU 1001, the ROM 1002 and the RAM 1003 are linked with each other via a bus 1004. An input/output interface 1005 is also linked to the bus 1004.

The following components are linked to the input/output interface 1005: an input section 1006 including a keyboard, a mouse and the like, an output section 1007 including a display such as a cathode ray tube (CRT), a liquid crystal display (LCD), a speaker and the like, a memory section 1008 including hard disc and the like, and a communication section 1009 including a network interface card such as a LAN card, a modem and the like. The communication section 1009 performs communication processing via a network such as the Internet.

A driver 1010 may also be linked to the input/output interface 1005, if needed. If needed, a removable medium 1011, for example, a magnetic disc, an optical disc, a magnetic optical disc, a semiconductor memory and the like, may be installed in the driver 1010, so that the computer program read therefrom is installed in the memory section 1008 as appropriate.

In a case where the foregoing steps and processing is achieved through software, programs forming the software are installed from a network such as the Internet or a memory medium such as the removable medium 1011.

It should be appreciated by those skilled in the art that the memory medium is not limited to the removable medium 1011 shown in FIG. 10, which has program stored therein and is distributed separately from the method so as to provide the programs to users. The removable medium 1011 may be, for example, a magnetic disc, a compact disc (including compact disc read-only memory (CD-ROM) and digital versatile disc (DVD), a magneto optical disc (including mini disc (MD)), and a semiconductor memory. Alternatively, the memory medium may be the hard discs included in ROM 1002 and the memory section 1008 in which programs are stored, and can be distributed to users along with the device in which they are incorporated.

The base station according to the present disclosure, for example, can be implemented as any types of evolved node B (eNB), such as a macro eNB and a small eNB. The small eNB may be an eNB of a cell having a smaller coverage range than a macro cell, such as a pico-cell eNB, a micro eNB and a family (femto-cell) eNB. Alternatively, the base station may also be implemented as any types of base stations, such as a NodeB and a base transceiver station (BTS). The base station may include an entity (also referred to a base station device) configured to control wireless communication; and one or more remote radio heads (RRHs) arranged in a position different from the entity. With the development of C-RAN (Centralized, Cooperative, Cloud RAN), the above entity controlling the wireless communication may be also a baseband cloud processing device such as a server. In addition, any types of terminals described below can operate as a base station by temporarily or semi-persistently performing a function of the base station.

The user equipment according to the present disclosure can be implemented as a mobile terminal (such as a smart phone, a panel personnel computer (PC), a notebook PC, an intelligent wearing device, a portable game terminal, a portable/dongle mobile router and a digital camera), an intelligent vehicle or a vehicle terminal (such as an automobile navigation device). In addition, the user equipment may be implemented as a terminal performing machine-to-machine (M2M) communication (referred to as a machine type communication (MTC) terminal). In addition, the user equipment may be a wireless communication module (such as an integrated circuit module including a single wafer) installed on each of the terminals described above.

Application examples of the base station and the user equipment are described below with examples in conjunction with FIGS. 11 to 13.

Figure 11:
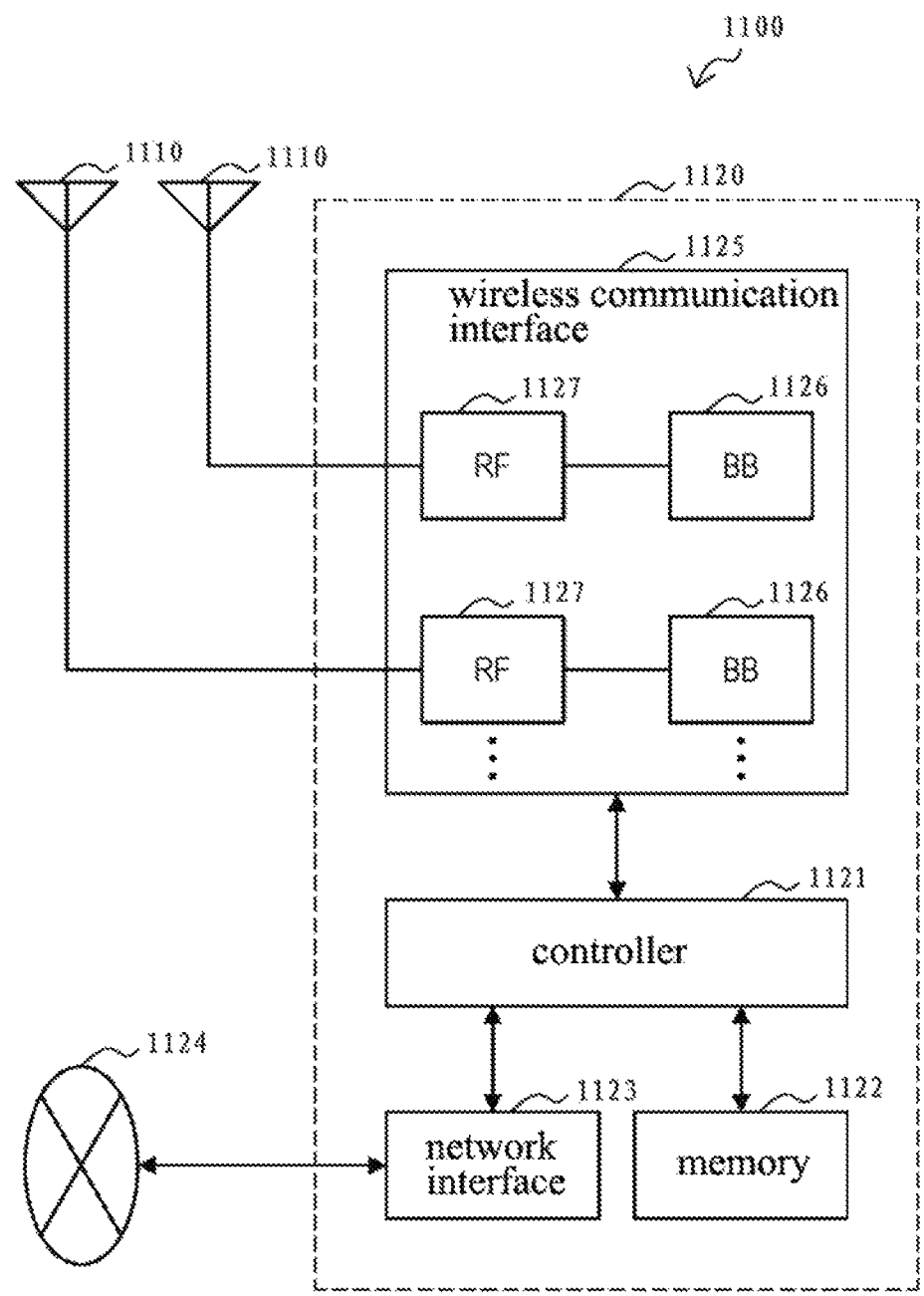
FIG. 11 is a block diagram illustrating a first example of a schematic configuration of an eNB to which the technology according to the present disclosure can be applied.
Figure 12:
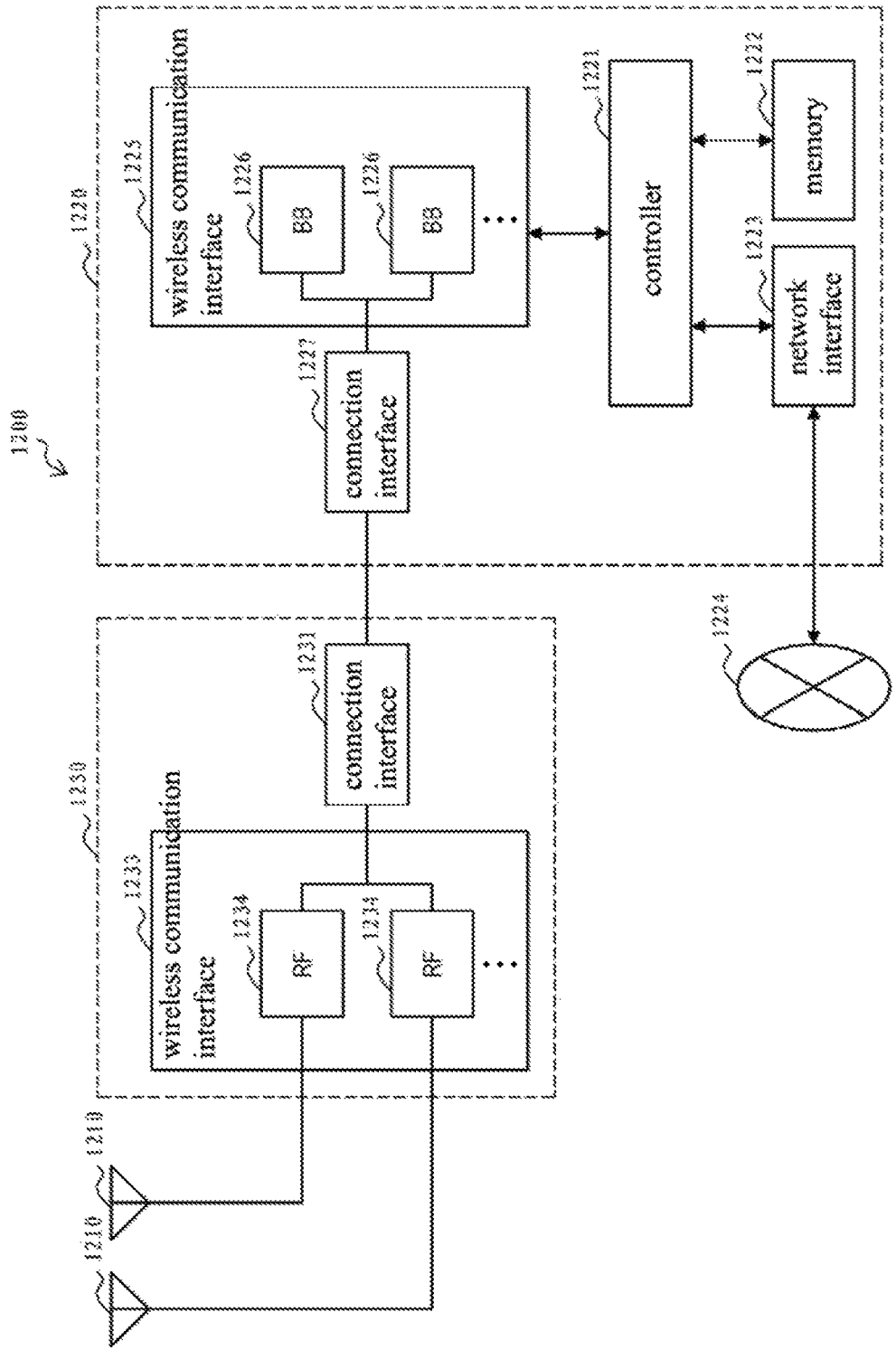
FIG. 12 is a block diagram illustrating a second example of a schematic configuration of an eNB to which the technology according to the present disclosure can be applied.

In a specified scenario, the base station according to the present disclosure described above may be implemented by a macro base station or a small cell base station, and the macro base station and the small cell base station may be implemented by eNBs shown in FIGS. 11 and 12.

FIG. 11 is a block diagram illustrating a first example of an schematic configuration of an eNB to which the technology according to the present disclosure may be applied. An eNB 1100 includes one or more antennas 1110 and a base station device 1120. The base station device 1120 may be connected to each of the antennas 1110 via an RF cable.

Each of the antennas 1110 includes a single or multiple antenna elements (for example, multiple antenna elements included in the multiple input multiple output (MIMO) antenna), and is used for the base station device 1120 to transmit and receive wireless signals. As shown in FIG. 11, the eNB 1100 may include multiple antennas 1110. For example, the multiple antennas 1110 may be compatible with multiple frequency bands used by the eNB 1100. Although FIG. 11 illustrates the example in which the eNB 1100 includes multiple antennas 1110, the eNB 1100 may also include a single antenna 1110.

The base station device 1120 includes a controller 1121, a memory 1122, a network interface 1123 and a wireless communication interface 1125.

The controller 1121 may be, for example, a CPU or DSP, and performs various functions of upper layers of the base station device 1120. For example, the controller 1121 generates a data packet from data in signals processed by the wireless communication interface 1125, and transfers the generated packet via the network interface 1123. The controller 1121 may bundle data from multiple baseband processors to generate bundled data, and transfers the generated bundled data. The controller 1121 may have logical function of performing control such as radio resource control, radio bearer control, mobility management, admission control and scheduling. The control may be performed in cooperation with an eNB or a core network node in the vicinity.

The memory 1122 includes RAM and ROM, and stores the program that is performed by the controller 1121 and various types of control data (such as a terminal list, transmission power data and scheduling data).

The network interface 123 is a communication interface for connecting the base station device 1120 to the core network 1124. The controller 1121 may communication with a core network node or another eNB via the network interface 1123. In this case, the eNB 1100 and the core network node or other eNB may be connected to each other through a logic interface (such as an S1 interface and an X2 interface). The network interface 1123 may also be a wired communication interface or a wireless communication interface for wireless backhaul. If the network interface 1123 is a wireless communication interface, the network interface 1123 may use a higher frequency band for wireless communication than a frequency band used by the wireless communication interface 1125.

The wireless communication interface 1125 supports any cellular communication scheme (such as the long term evolution (LTE) and the LTE-Advanced), and provides wireless connection to a terminal located in the cell of the eNB 1100 via the antenna 1110. The wireless communication interface 1125 may typically include for example a baseband (BB) processor 1126 and an RF circuit 1127. The BB processor 1126 may perform, for example, coding/decoding, modulating/demodulating and multiplexing/demultiplexing, and performs various types of signal processing of the layer (such as L1, media access control (MAC), radio link control (RLC) and a packet data convergence protocol (PDCP)). Instead of the controller 1121, the BB processor 1126 may have a part or all of the above-described logical functions. The BB processor 1126 may be a memory that stores the communication control program, or a module that includes a processor and related circuit configured to perform the program. Updating the program may allow the functions of the BB processor 1126 to be changed. The module may be a card or a blade that is inserted into the slot of the base station device 1120. Alternatively, the module may be a chip that is mounted on the card or the blade. Meanwhile, the RF circuit 1127 may include, for example, a mixer, a filter and an amplifier, and transmit and receive wireless signals via the antenna 1110.

As shown in FIG. 11, the wireless communication interface 1125 may include multiple BB processors 1126. For example, the multiple BB processors 1126 may be compatible with the multiple frequency bands used by the eNB 1100. As shown in FIG. 11, the wireless communication interface 1125 may include multiple RF circuits 1127. For example, the multiple RF circuits 1127 may be compatible with multiple antenna elements. Although an example in which the wireless communication interface 1125 includes multiple BB processors 1126 and multiple RF circuits 1127 is shown in FIG. 11, the wireless communication interface 1125 may include a single BB processor 1126 or a single RF circuit 1127.

FIG. 12 is a block diagram illustrating a second example of an illustrative configuration of an eNB to which the technology according to the present disclosure is applied. An eNB 1200 includes one or more antennas 1210, a base station device 1220 and an RRH 1230. The RRH 1230 may be connected to each of the antennas 1210 via an RF cable. The base station device 1220 and the RRH 1230 may be connected to each other via a high-speed line such as an optical fiber cable.

Each of the antennas 1210 includes one or more antenna elements (such as the multiple antenna elements included in the MIMO antenna), and is used for the RRH 1230 to transmit and receive the wireless signal. As show in FIG. 12, the eNB 1200 may include multiple antennas 1210. For example, the multiple antennas 1210 may be compatible with the multiple frequency bands used by the eNB 1200. The eNB 1200 may also include a single antenna 1210 although FIG. 12 shows an example in which the eNB 1200 includes multiple antennas 1210.

The base station device 1220 includes a controller 1221, a memory 1222, a network interface 1223, a wireless communication interface 1225 and a connection interface 1227. The controller 1221, the memory 1222 and the network interface 1223 are the same as the controller 1221, the memory 1222 and the network interface 1223 described by referring to FIG. 12, and the network interface 1223 is configured to connect the base station device 1220 to a core network 1224.

The wireless communication interface 1225 supports any cellular communication scheme (such as LTE and the LTE-Advanced), and provides a wireless communication to a terminal located in a sector corresponding to the RRH 1230 via the RRH 1230 and the antenna 1210. The wireless communication interface 1225 may typically include, for example, a BB processor 1226. The BB processor 1226 is the same as the BB processor 1126 described by referring to FIG. 11, except that the BB processor 1226 is connected to an RF circuit 1234 of the RRH 1230 via the connection interface 1227. As shown in FIG. 12, the wireless communication interface 1226 may include multiple BB processors 1226. For example, the multiple BB processors 1226 may be compatible with multiple frequency bands used by the eNB 1200. Although FIG. 12 shows an example that the wireless communication interface 1225 includes multiple BB processors 1226, the wireless communication interface 1225 may include a single BB processor 1226.

The connection interface 1227 is an interface for connecting the base station device 1220 (the wireless communication interface 1225) to the RRH 1230. Alternatively, the connection interface 1227 may be a communication module for communication in the above-described high-speed line that connects the base station device 1220 (the wireless communication interface 1225) to the RRH 1230.

The RRH 1230 includes a connection interface 1231 and a wireless communication interface 1233.

The connection interface 1231 is an interface for connecting the RRH 1230 (the wireless communication interface 1233) to the base station device 1220. The connection interface 1231 may also be a communication module for the communication in the above high-speed line.

The wireless communication interface 1233 transmits and receives wireless signals via the antenna 1210. The wireless communication interface 1233 may typically include, for example, an RF circuit 1234. The RF circuit 1234 may include, for example, a mixer, a filter and an amplifier, and transmits and receives wireless signals via the antenna 1210. As shown in FIG. 12, the wireless communication interface 1233 may include multiple RF circuits 1234. For example, multiple RF circuits 1234 may support multiple antenna elements. Although FIG. 12 shows an example in which the wireless communication interface 1233 includes multiple RF circuits 1234, the wireless communication interface 1233 may include a single RF circuit 1234.

In the eNB 1100 and eNB 1200 shown in FIG. 11 and FIG. 12, the communication unit shown in FIG. 5 may be implemented by a combination of the wireless communication interface 1125 of the eNB 1100 and the antenna 1110 or by the network interface 1123, or may be implemented by the RRH 1230 of the eNB 1200 and the wireless communication interface 1225 of the base station device 1220 via connection interfaces therebetween. For example, the identity group determining unit 401/501, secondary synchronization signal sequence generating unit 402/502 and information updating unit 504 can be implemented by the controller 1121 or the controller 1221.

The communication devices according to the embodiments of the present disclosure described above can be implemented as a smart phone. For example, the smart phone may serve as a wifi access device by enabling a will hotspot function. A wifi connection between the smart phone and other smart terminals uses unauthorized frequency spectrum resources. The smart phone is managed directly by, for example, a frequency spectrum manger, to use the unauthorized frequency spectrum.

Figure 13:
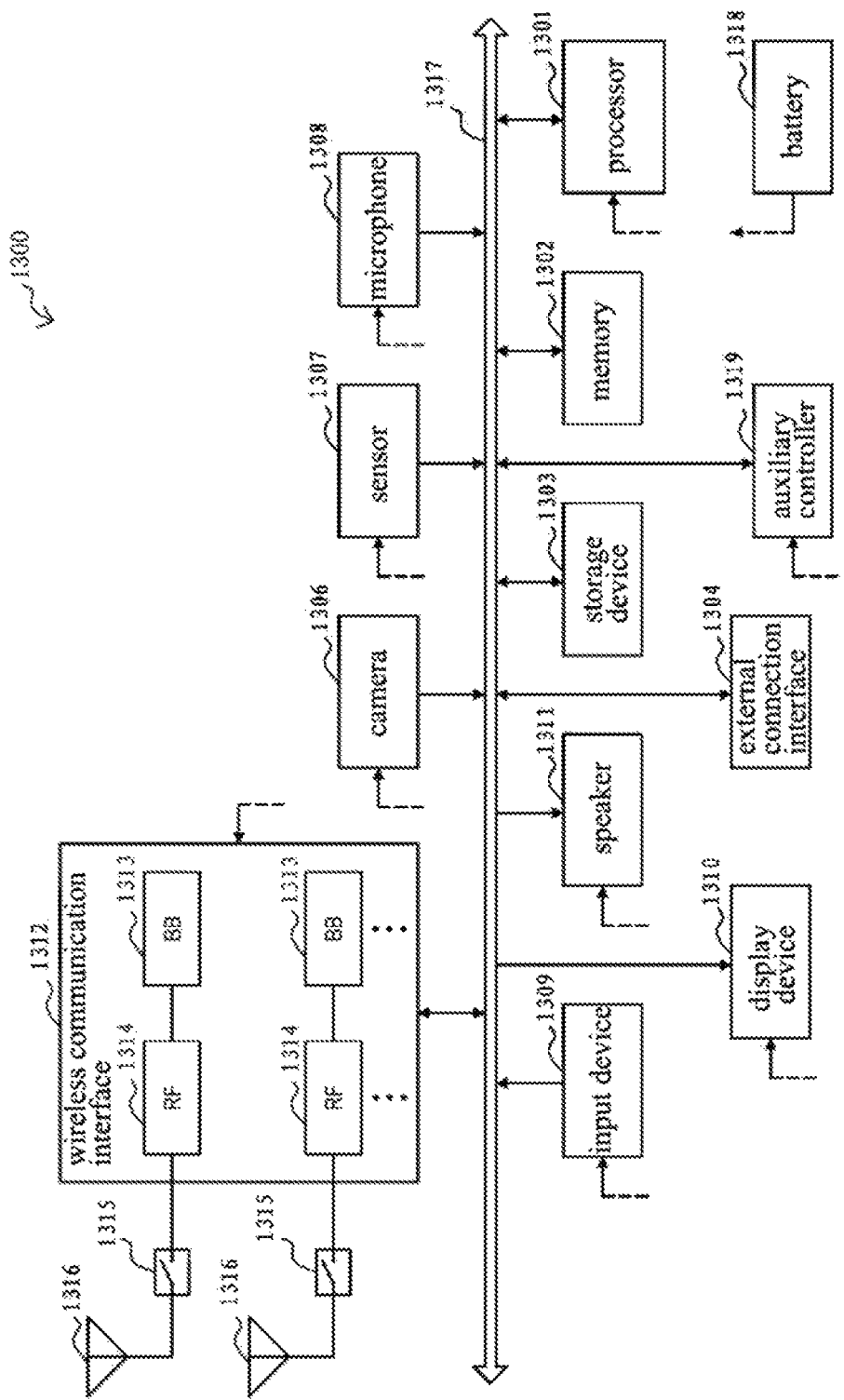
FIG. 13 is a block diagram illustrating a schematic configuration of a smart phone to which the technology according to the present disclosure can be applied.

FIG. 13 is a block diagram illustrating an illustrative configuration of a smart phone 1300 in which the technology according to the present disclosure may be applied. The smart phone 1300 may include a processor 1301, a memory 1302, a storage device 1303, an external connection interface 1304, a camera 1306, a sensor 1307, a microphone 1308, an input device 1309, a display device 1310, a speaker 1311, a wireless communication interface 1312, one or more antenna switches 1315, one or more antennas 1316, a bus 1317, a battery 1318 and an auxiliary controller 1319.

The processor 1301 may be, for example, a CPU or a system on chip (SoC), and controls functions of an application layer and another layer of the smart phone 1300. The memory 1302 includes a RAM and a ROM, and stores a program executed by the processor 1301 and data. The storage device 1303 may include a storage medium such as a semiconductor memory and a hard disk. The external connection interface 1304 is an interface connecting the external device (such as a memory card and a universal serial bus (USB) device) to the smart phone 1300.

The camera 1306 includes an image sensor (such as a charge-coupled device (CCD) and a complementary metal oxide semiconductor (CMOS)), and generates a captured image. The sensor 1307 may include a group of sensors such as a measurement sensor, a gyro sensor, a geomagnetic sensor and an acceleration sensor. The microphone 1308 converts sounds inputted to the smart phone 1300 to audio signals. The input device 1309 includes, for example, a touch sensor configured to detect touch onto a screen of the display device 1310, a keypad, a keyboard, a button or a switch and receives an operation and information inputted from the user. The display device 1310 includes a screen (such as a liquid crystal display (LCD) and an organic light-emitting diode (OLED) display), and displays an output image of the smart phone 1300. The speaker 1311 converts the audio signals outputted from the smart phone 1300 into sounds.

The wireless communication interface 1312 supports any cellular communication scheme (such as LTE and LTE-advanced), and performs wireless communication. The wireless communication interface 1312 may typically include, for example, a BB processor 1313 and an RF circuit 1314. The BB processor 1313 may execute, for example, coding/decoding, modulating/demodulating and multiplexing/demultiplexing, and execute various types of signal processing for wireless communication. Meanwhile, the RF circuit 1314 may include, for example, a mixer, a filter or an amplifier, and transmit and receive wireless signals via the antenna 1316. The wireless communication interface 1312 may be a chip module on which the BB processor 1313 and the RF circuit 1314 are integrated. As shown in FIG. 13, the wireless communication interface 1312 may include multiple BB processors 1313 and multiple RF circuits 1314. Although FIG. 13 shows an example in which the wireless communication interface 1312 includes multiple BB processors 1313 and multiple RF circuits 1314, the wireless communication interface 1312 may include a single BB processor 1313 and a single RF circuit 1314.

In addition to the cellular communication scheme, the wireless communication interface 1312 may support another type of wireless communication scheme, such as a short-distance wireless communication scheme, a near field communication scheme and a wireless local area network (LAN) scheme. In this case, the wireless communication interface 1312 may include a BB processor 1313 and a RF circuit 1314 for each wireless communication scheme.

Each of the antenna switches 1315 switches a connection destination of the antenna 1316 among multiple circuits (for example, circuits for different wireless communication schemes) included in the wireless communication interface 1312.

Each of the antennas 1316 includes one or more antenna elements (for example, multiple antenna elements included in the MIMO antenna), and is used for the wireless communication interface 1312 to transmit and receive wireless signals. As shown in FIG. 13, the smart phone 1300 may include multiple antennas 1316. Although FIG. 13 shows an example in which the smart phone 1300 includes multiple antennas 1316, the smart phone 1300 may include a single antenna 1316.

In addition, the smart phone 1300 may include an antenna 1316 for each wireless communication scheme. In this case, the antenna switch 1315 may be omitted from the configuration of the smart phone 1300.

The bus 1317 connects the processor 1301, the memory 1302, the storage device 1303, the external connection interface 1304, the camera 1306, the sensor 1307, the microphone 1308, the input device 1309, the display device 1310, the speaker 1311, the wireless communication interface 1312 and the auxiliary controller 1319 with one another. The battery 1318 supplies power to each block in the smart phone 1300 shown in FIG. 13 via a feed line. The feed line is partially shown as a dash line in FIG. 13. The auxiliary controller 1319, for example, operates a minimum necessary function of the smart phone 1300, for example, in a sleep mode.

In the smart phone 1300 shown in FIG. 13, for example, the searching unit 101/201, the synchronizing unit 102/202 and the detecting unit 203 can be implemented by the processor 1301. In addition, the notifying unit 204 and communication unit 701 can be implemented by the wireless communication interface 1312 or a combination of the wireless communication interface 1312 and the antenna 1316.

It can be understood that, the terms mentioned herein are only for describe certain embodiments, and are not intended to limit the present disclosure. "a" and "the" in a singular form used herein are intended to include a plural form, unless the context clearly indicates otherwise. It should be further known that, in the case that the word "include" used in the specification indicates that there are the mentioned features, entirety, steps, operations, units and/or components, without excluding that one or more other features, entirety, steps, operations, units and/or components or a combination thereof exist or are added.

In the aforementioned specification, the present disclosure is described by referring to certain embodiments. However, it is understood by those skilled in the art that various modification and changes can be made to the present disclosure without deviating from the scope of the present disclosure claimed by the claims.

The technology according to the present disclosure may be further implemented with the following embodiments.

1. A device on a terminal side in a wireless communication system, including:

a searching unit configured to search for a target cell by means of a synchronization signal sequence corresponding to a target frequency range to be searched; and a synchronizing unit configured to perform synchronization based on a synchronization signal detected by the searching unit, so as to synchronize the device with the target cell;

where in a case that the target frequency range falls within a first frequency range, the searching unit searches for the target cell by means of a synchronization signal sequence in a first subset of a synchronization signal sequence set, the first subset being a proper subset of the synchronization signal sequence set.

2. The device on the terminal side according to solution 1, where the first frequency range is a range on unauthorized frequency band for the wireless communication system, and the target cell is a cell which is accessed on unauthorized frequency spectrum.

3. The device on the terminal side according to solution 2, where the synchronization signal sequence set is used when the device communicates via a carrier on authorized frequency band.

4. The device on the terminal side according to any one of solutions 1 to 3, where the synchronization signal sequence is a secondary synchronization signal sequence, and the searching unit is configured to decode a secondary synchronization signal of the target cell by means of the secondary synchronization signal sequence corresponding to the target frequency range.

5. The device on the terminal side according to any one of solutions 1 to 4, further including: a communication interface configured to acquire a command for searching for the target cell and indication information of the first subset through a first cell on the authorized frequency band.

6. The device on the terminal side according to solution 5, where the communication interface receives upper-layer signaling comprising the command and the indication information through the first cell.

7. The device on the terminal side according to any one of solutions 1 to 4, further including a communication interface configured to acquire an indication related to an updated synchronization signal sequence through the target cell after the device accesses to the target cell.

8. The device on the terminal side according to any one of solutions 1 to 7, further including:

a detecting unit configured to detect whether an interference to a reference signal received by the device in the first frequency range is too large due to usage of the first subset; and a notifying unit configured to notify a base station of the target cell of a result of the detecting when it is detected that the interference is too large.

9. The device on the terminal side according to solution 8, where the synchronization signal sequence set includes a plurality of proper subsets for cell search for the first frequency range, and the searching unit detects an indication that the base station of the target cell re-selects a second subset from the plurality of proper subsets in response to the notification that the interference is too large, and a synchronization signal re-transmitted by the base station of the target cell, the second subset being different from the first subset; and the searching unit decodes the re-transmitted synchronization signal by means of the second subset based on the indication.

10. The device on the terminal side according to any one of solutions 1 to 9, where when the device performs long-term evolution assisted unauthorized frequency spectrum access, the searching unit uses a secondary synchronization signal of a cell where the device previously resides as the synchronization signal sequence to perform searching.

11. The device on the terminal side according to any one of solutions 1 to 9, where if the device needs to perform inter-cell handover, the searching unit acquires an indication related to the first subset based on radio resource control configuration information from a base station.

12. The device on the terminal side according to solution 11, where the synchronization signal sequence set includes a plurality of proper subsets for cell search for the first frequency range, and a sequence number of the first subset is included in the radio resource control configuration information.

13. The device on the terminal side according to any one of solutions 1 to 12, where in a case that the target cell cannot be searched out with all the sequences in the first subset, the searching unit searches by using a sequence in a third subset which is one of the plurality of proper subsets for the cell search for the first frequency range and which is different from the first subset.

14. A wireless communication method performed by a device on a terminal side, including:
searching for a target cell by means of a synchronization signal sequence corresponding to a target frequency range to be searched; and
performing synchronization based on a searched synchronization signal so as to synchronize the device with the target cell;
where in a case that the target frequency range falls within a first frequency range, the target cell is searched by means of a synchronization signal sequence in a first subset of a synchronization signal sequence set, the first subset being a proper subset of the synchronization signal sequences set.

15. A device on a base station side in a wireless communication system, including:
an identity group determining unit configured to determine a physical layer cell identity group for a target cell, where the physical layer cell identity group is related to a frequency range for the target cell, and
a secondary synchronization signal sequence generating unit configured to generate a secondary synchronization signal sequence for a secondary synchronization signal of the target cell based on the physical layer cell identity group;
where in a case that the frequency range for the target cell falls within a first frequency range, the physical layer cell identity group is a first subset of a physical layer cell identity group set, the first subset being a proper subset of the physical layer cell identity group set.

16. The device on the base station side according to solution 15, where the first frequency range is a range on unauthorized frequency band for the wireless communication system, and the target cell is a cell which is accessed on unauthorized frequency spectrum.

17. The device on the base station side according to solution 16, further including a communication unit configured to transmit the secondary synchronization signal on unauthorized frequency band corresponding to the target cell.

18. The device on the base station side according to solution 16, further including:
a communication unit configured to receive, from a terminal, a notification that an interference to a reference signal received by the terminal is too large due to usage of the first subset;
where in response to receiving the notification, the identity group determining unit re-determines a second subset of the physical layer cell identity group set as the physical layer cell identity group, the second subset being a proper subset of the physical layer cell identity group set and being different from the first subset, and the secondary synchronization signal sequence generating unit re-generates the secondary synchronization signal sequence based on the second subset.

19. The device on the base station side according to solution 18, further including:
an information updating unit configured to generate system broadcast information comprising indication information related to the second subset and to be transmitted through the target cell.

20. The device on the base station side according to solution 18, further including:
an information updating unit configured to generate system broadcast information comprising indication information related to the second subset and to be transmitted on authorized frequency band.

21. The device on the base station side according to any one of solutions 18 to 20, where the communication unit is further configured to notify another device on the base station side in the wireless communication system of the indication information of the second subset.

22. The device on the base station side according to any one of solutions 15 to 21, where
the device on the base station side acquires a physical layer cell identity group subset for a neighboring cell of the target cell, and in a case that radio resource management involving the neighboring cell is performed on a device on a terminal side in current cell, the device on the base station side generates radio resource control signaling to notify the device on the terminal side of the cell identify group subset for the neighboring cell.

23. The device on the base station side according to solution 18, where the communication unit is further configured to, in response to receiving the notification, report an event that the interference is too large to a core network through an S1 interface and acquire information related to an updated cell identity group from the core network.

24. A wireless communication method performed by a device on a base station side, including:
determining a physical layer cell identity group for a target cell, where the physical layer cell identity group is related to a frequency range for the target cell; and
generating a secondary synchronization signal sequence for a secondary synchronization signal of the target cell based on the physical layer cell identity group;
where in a case that the frequency range for the target cell falls within a first frequency range, the physical layer cell identity group is a first subset of a physical layer cell identity group set, the first subset being a proper subset of the physical layer cell identity group set.

25. A wireless terminal device capable of communicating with a base station on a first carrier, including:
a communication unit configured to receive a synchronization signal transmitted from the base station on a second carrier different from the first carrier; and
a synchronizing unit configured to match a secondary synchronization signal in the synchronization signal with a sequence in a first subset of a secondary synchronization signal sequence set, to determine the secondary synchronization signal, the first subset being a proper subset of the secondary synchronization signal sequence set.

26. A base station in a wireless communication system, where the base station is capable of communicating with a wireless communication terminal on a first carrier, and the base station includes:

a communication unit configured to transmit a synchronization signal comprising a secondary synchronization signal on a second carrier different from the first carrier;

where the secondary synchronization signal is selected from a first subset of a secondary synchronization signal sequence set, the first subset being a proper subset of the secondary synchronization signal sequence set.

The invention claimed is:

1. A device on a terminal side in a wireless communication system, comprising:
a searching unit configured to search for a target cell by based on a synchronization signal sequence corresponding to a target frequency range to be searched; and
a synchronizing unit configured to perform synchronization based on a synchronization signal detected by the searching unit, so as to synchronize the device with the target cell;
wherein in a case that the target frequency range falls within a first frequency range, the searching unit searches for the target cell based on a synchronization signal sequence in a first subset of a synchronization signal sequence set, the first subset being a proper subset of the synchronization signal sequence set, wherein the device on the terminal side is a user equipment, and further comprises a communication interface configured to acquire a command for searching for the target cell and indication information of the first subset through a first cell on an authorized frequency band.

2. The device on the terminal side according to claim 1, wherein the first frequency range is a range on unauthorized frequency band for the wireless communication system, and the target cell is a cell which is accessed on unauthorized frequency spectrum.

3. The device on the terminal side according to claim 2, wherein the synchronization signal sequence set is used when the device communicates via a carrier on authorized frequency band.

4. The device on the terminal side according to claim 1, wherein the synchronization signal sequence is a secondary synchronization signal sequence, and the searching unit is configured to decode a secondary synchronization signal of the target cell by means of the secondary synchronization signal sequence corresponding to the target frequency range.

5. The device on the terminal side according to claim 1, wherein the communication interface receives signaling comprising the command and the indication information through the first cell.

6. The device on the terminal side according to claim 1, wherein the device on the terminal side is a user equipment, and further comprises a communication interface configured to acquire an indication related to an updated synchronization signal sequence through the target cell after the device accesses to the target cell.

7. The device on the terminal side according to claim 1, further comprising:
a detecting unit configured to detect whether an interference to a reference signal received by the device in the first frequency range is too large due to usage of the first subset; and
a notifying unit configured to notify a base station of the target cell of a result of the detecting when it is detected that the interference is too large.

8. The device on the terminal side according claim 7, wherein the synchronization signal sequence set comprises a plurality of proper subsets for cell search for the first frequency range, and the searching unit detects an indication that the base station of the target cell re-selects a second subset from the plurality of proper subsets in response to the notification that the interference is too large, and a synchronization signal re-transmitted by the base station of the target cell, the second subset being different from the first subset; and
the searching unit decodes the re-transmitted synchronization signal by means of the second subset based on the indication.

9. The device on the terminal side according to claim 1, wherein when the device performs long-term evolution assisted unauthorized frequency spectrum access, the searching unit uses a secondary synchronization signal of a cell where the device previously resides as the synchronization signal sequence to perform searching.

10. The device on the terminal side according to claim 1, wherein in a case that the device needs to perform inter-cell handover, the searching unit acquires an indication related to the first subset based on radio resource control configuration information from a base station.

11. The device on the terminal side according to claim 10, wherein the synchronization signal sequence set comprises a plurality of proper subsets for cell search for the first frequency range, and a sequence number of the first subset is included in the radio resource control configuration information.

12. The device on the terminal side according to claim 1, wherein in a case that the target cell cannot be searched out with all the sequences in the first subset, the searching unit searches by using a sequence in a third subset which is one of the plurality of proper subsets for the cell search for the first frequency range and which is different from the first subset.

13. A wireless communication method performed by a device on a terminal side, comprising:
searching for a target cell based on a asynchronization signal sequence corresponding to a target frequency range to be searched; and
performing synchronization based on a searched synchronization signal so as to synchronize the device with the target cell, wherein
in a case that the target frequency range falls within a first frequency range, the target cell is searched based on a synchronization signal sequence in a first subset of a synchronization signal sequence set, the first subset being a proper subset of the synchronization signal sequences set, and
the method further comprises acquiring a command for searching for the target cell and indication information of the first subset through a first cell on an authorized frequency band.

14. A device on a base station side in a wireless communication system, comprising:
an identity group determining unit configured to determine a physical layer cell identity group for a target cell, wherein the physical layer cell identity group is related to a frequency range for the target cell; and
a secondary synchronization signal sequence generating unit configured to generate a secondary synchronization signal sequence for a secondary synchronization signal of the target cell based on the physical layer cell identity group, wherein
in a case that the frequency range for the target cell falls within a first frequency range, the physical layer cell identity group is a first subset of a physical layer cell identity group set, the first subset being a proper subset of the physical layer cell identity group set, and the device further comprises a communication interface configured to transmit a command for searching for the target cell and indication information of the first subset through a first cell on an authorized frequency band to a user equipment.

15. The device on the base station side according to claim 14, Wherein the first frequency range is a range on unauthorized frequency band for the wireless communication system, and the target cell is a cell which is accessed on unauthorized frequency spectrum.

16. The device on the base station side according to claim 15, wherein the device on the base station side is an eNB, and further comprises a communication unit configured to transmit the secondary synchronization signal on unauthorized frequency band corresponding to the target cell.

17. The device on the base station side according to claim 14, wherein the device on the base station side acquires a physical layer cell identity group subset for a neighboring cell of the target cell, and in a case that radio resource management involving the neighboring cell is performed on a device on a terminal side in current cell, the device on the base station side generates radio resource control signaling to notify the device on the terminal side of the cell identify group subset for the neighboring cell.

18. A wireless terminal device capable of communicating with a base station on a first carrier, comprising;

a communication unit configured to receive a synchronization signal transmitted from the base station on a second carrier different from the first carrier; and a synchronizing unit configured to match a secondary synchronization signal in the synchronization signal with a sequence in a first subset of a secondary synchronization signal sequence set, to determine the secondary synchronization signal, the first subset being a proper subset of the secondary synchronization signal sequence set, wherein the communication unit is further configured to acquire a command for searching for a target cell on the second carrier and indication information of the first subset through a first cell on an authorized frequency band.

19. A base station in a wireless communication system, wherein the base station is capable of communicating with a wireless communication terminal on a first carrier, the base station comprising:

a communication unit configured to transmit synchronization signal comprising a secondary synchronization signal on a second carrier different from the first carrier;

wherein the secondary synchronization signal is selected from a first subset of a secondary synchronization signal sequence set, the first subset being a proper subset of the secondary synchronization signal sequence set, wherein the communication unit is further configured to acquire a command for searching for a target cell on the second carrier and indication information of the first subset through a first cell on an authorized frequency band to a user equipment.

* * * * *